US011273612B2

(12) United States Patent
Jansen

(10) Patent No.: US 11,273,612 B2
(45) Date of Patent: Mar. 15, 2022

(54) METHOD AND DEVICE FOR PRODUCING A PLASTIC PROFILE

(71) Applicant: Thomas GmbH + Co. Technik + Innovation KG, Bremervörde (DE)

(72) Inventor: Klaus Jansen, Buxtehude (DE)

(73) Assignee: Thomas GmbH + Co. Technik + Innovation KG, Bremervörde (DE)

( * ) Notice: Subject to any disclaimer, the term of this patent is extended or adjusted under 35 U.S.C. 154(b) by 376 days.

(21) Appl. No.: 16/318,514

(22) PCT Filed: Jul. 11, 2017

(86) PCT No.: PCT/EP2017/000818
§ 371 (c)(1),
(2) Date: Jan. 17, 2019

(87) PCT Pub. No.: WO2018/024357
PCT Pub. Date: Feb. 8, 2018

(65) Prior Publication Data
US 2019/0240931 A1    Aug. 8, 2019

(30) Foreign Application Priority Data
Aug. 16, 2016  (DE) .......................... 102016009953.4

(51) Int. Cl.
*B29C 70/52*    (2006.01)
*B29C 70/56*    (2006.01)

(52) U.S. Cl.
CPC .......... *B29C 70/523* (2013.01); *B29C 70/525* (2013.01); *B29C 70/528* (2013.01); *B29C 70/56* (2013.01)

(58) Field of Classification Search
CPC ........................ B29C 70/52–528; B29C 70/56
See application file for complete search history.

(56) References Cited

U.S. PATENT DOCUMENTS

| 3,684,622 | A | * | 8/1972 | Goldsworthy | ........ | B29C 70/528 |
| | | | | | | 156/441 |
| 5,174,844 | A | * | 12/1992 | Tong | ..................... | B29C 70/523 |
| | | | | | | 156/180 |
| 9,393,741 | B2 | * | 7/2016 | Jansen | ..................... | B29C 48/09 |
| 9,630,360 | B2 | * | 4/2017 | Jansen | .................. | B29C 70/526 |
| 10,052,829 | B2 | * | 8/2018 | Jansen | .................... | B29C 70/68 |
| 10,456,998 | B2 | * | 10/2019 | Jansen | .................. | B29C 70/523 |
| 2009/0206515 | A1 | * | 8/2009 | Jansen | .................. | B29C 70/525 |
| | | | | | | 264/257 |

(Continued)

FOREIGN PATENT DOCUMENTS

DE    102014001082    *  7/2015
DE    102014011943  A1    2/2016

OTHER PUBLICATIONS

WIPO, International Search Report (in the parent application), dated Oct. 9, 2017.

*Primary Examiner* — Jeffrey M Wollschlager
(74) *Attorney, Agent, or Firm* — Laurence P. Colton; Smith Tempel Blaha LLC

(57) ABSTRACT

A method and a device for fault-free production of individually curved plastic profiles. This is achieved in that the mold and the holding means are moved in opposite directions on the plastic profile, wherein the plastic profile is moved alternately by the mold and the holding means in a production direction with different movement patterns.

10 Claims, 4 Drawing Sheets

(56) References Cited

U.S. PATENT DOCUMENTS

| | | | | |
|---|---|---|---|---|
| 2014/0117581 A1* | 5/2014 | Jansen | ................ | B29C 70/528 |
| | | | | 264/164 |
| 2014/0284843 A1* | 9/2014 | Jansen | ................ | B29C 70/526 |
| | | | | 264/258 |
| 2015/0137421 A1* | 5/2015 | Jansen | ................ | B29D 23/001 |
| | | | | 264/271.1 |
| 2016/0339604 A1* | 11/2016 | Jansen | .................. | B29C 70/52 |

* cited by examiner

METHOD AND DEVICE FOR PRODUCING A PLASTIC PROFILE

CROSS REFERENCE TO RELATED APPLICATIONS

This application is the US National Phase of and claims the benefit of and priority on International Application No. PCT/EP2017/000818 having a filing date of 11 Jul. 2017, which claims priority on and the benefit of German Patent Application No. 10 2016 009 474.5 having a filing date of 5 Aug. 2016 and German Patent Application No. 10 2016 009 953.4 having a filing date of 16 Aug. 2016.

BACKGROUND OF THE INVENTION

Technical Field

The invention relates to a method for producing a preferably curved plastic profile, wherein a continuous reinforcement comprising strands, webs and/or the like is guided by a holding means through a mold and embedded in plastic in the mold. The invention furthermore relates to a device for producing a preferably curved plastic profile having a mold, in which a continuous reinforcement can be embedded, and a holding means with which the plastic profile can be guided through the mold.

Prior Art

It is known that, in particular, linear plastic profiles made from plastic and a continuous reinforcement comprising fibers, webs or the like which are embedded in the plastic, can be produced continuously in a strand. This production usually refers to a pultrusion method. In such pultrusion methods, the at least one fiber strand is guided through a mold. As it is guided through, this fiber strand is provided, either before or in the mold, with liquid plastic which subsequently cures in the mold. The cured plastic profile which then exits the mold is pulled through the mold by a pull-off device or holding means arranged in front of the mold in the production direction, whereby it is simultaneously removed. Since the plastic profile is pulled through the mold by the holding means, in known methods of the type described, in particular in known pultrusion methods, only linear plastic profiles can be formed.

For producing curved plastic profiles, it is known that the mold must be moved for this purpose. This method is known as radius pultrusion. In this, the mold is periodically firstly moved relative to the stationary plastic profile and this plastic profile is removed in the counter movement via the opened holding means. This periodic moving and stopping of the plastic profile can cause fiber displacements and subsequent stresses or distortions to occur within the fiber strand of the profile to be produced before or in the impregnating unit. This mechanical stress or distortion has a negative impact on the structure or stability of the plastic profile since, in some circumstances, the fiber distribution is no longer homogeneous.

BRIEF SUMMARY OF THE INVENTION

The object on which the invention is based is therefore to create a method and a device for fault-free production of individually curved plastic profiles.

A method for achieving this object is a method for producing a preferably curved plastic profile, wherein a continuous reinforcement comprising strands, webs and/or the like is guided by a holding means through a mold and embedded in plastic in the mold, characterized in that the mold and the holding means are moved in opposite directions on the plastic profile, wherein the plastic profile is moved alternately by the mold and the holding means in a production direction. Accordingly, it is provided that the mold and the holding means are moved in opposite directions on the plastic profile, wherein the plastic profile is moved alternately by the mold and the holding means in a production direction. As a result of this, in particular, uninterrupted movement of the plastic profile, continuous removal of the plastic profile is possible. Phases in which the plastic profile is stationary can therefore be avoided. Since the plastic profile is therefore in uninterrupted movement, i.e. is not, or is only briefly, stationary, mechanical stresses or distortions in the plastic profile or in the guidance of the fiber material can be prevented. This increases the stability and the quality of the plastic profile.

In particular, the invention can provide that the plastic profile is held by the holding means and pulled in a production direction whilst the mold is moved on, in particular over, the plastic profile contrary to the production direction. An advantageous further development of the present invention furthermore consists in that the plastic profile is moved or pushed by the mold in the production direction whilst the holding means is moved contrary to the production direction on the plastic profile toward the mold, in particular brought into contact with the mold. As a result of this alternating holding and pulling of the plastic profile by the mold and the holding means, the semi-finished product of the plastic profile to be produced is subjected to a more uniform tensile force than with an isolated back and forth movement of only the mold. This force acting virtually uniformly on the supplied material then ensures a particularly uniform internal structure of the profile. As a result of this incremental molding in the mold coupled with an intermittent, predominantly pulling, removal of the plastic profile, curved plastic profiles, in particular, can also be produced since the forms of the profile are still predominantly consolidated in the movement of the periodically moving mold.

It can preferably furthermore be provided that the mold and the holding means are moved simultaneously, whilst the plastic profile is moved forward, in particular uninterruptedly, in the production direction by the mold or the holding means. In this case, the movement takes place such that the mold and the holding means are moved away from one another at the beginning of a production step to then contact one another again. During this caterpillar-like relative movement of the mold and the holding means, the plastic profile is constantly moved forward relative to the mold and/or to the holding means in the production direction.

A further exemplary embodiment of the present invention can moreover provide that the mold and the holding means are moved in and/or contrary to the production direction on the plastic profile at different velocities, in particular with different accelerations. It can therefore be provided, for example, that the holding means with the plastic profile is pulled in the production direction at twice the velocity as the mold is moved in the opposite direction. As a result of these movements of the mold and the holding means in opposite directions, the two velocity components are added together to give a production velocity which corresponds to the sum of the velocity values of the mold and the holding means. Equally, the mold can also be moved at a higher velocity contrary to the production direction than the holding means moves in the production direction.

For uniform removal of the plastic profile in the production direction, the return movement of the mold and the holding means into a starting position in which the spacing between the mold and the holding means is minimized takes place at the same velocity. Since the time spans in which the mold and the holding means move contrary to or in the production direction are identical, the removal distance of the plastic profile is smaller during the moving together of the mold and the holding means than during the previous moving apart of the mold and the holding means. As a result of these different velocities, the removal of the plastic profile therefore experiences slight variations; however, a totally stationary state is avoided. It is, however, also conceivable that it is not the time spans during which the mold or the holding means move contrary to or in the production direction which are the same, but the distances which the mold and the holding means cover on the plastic profile in spite of the different velocities. Depending on the velocity distribution of the mold and the holding means, it can occur that the mold or the holding means is briefly stationary on the plastic profile.

A further embodiment of the present invention can provide that the mold and the holding means are moved forward on the plastic profile with a different stroke or different amplitudes and/or frequencies. With these different stroke movements, it is possible to determine the curing process of the plastic profile in the mold, for example. Therefore, the velocity and the acceleration and the stroke of the mold or the holding means can be adjusted accordingly for different materials and diverse profile forms so that a plastic profile of the highest quality is generated. For example, for shaping the plastic profile, it can be advantageous if the mold and the holding means are moved at different frequencies. Whilst the mold carries out four strokes at a relative low amplitude, for example, the holding means executes only one stroke movement in the same time period, albeit with an, in particular correspondingly, greater amplitude. On the other hand, it is equally provided that the holding means carries out a plurality of strokes whilst the mold executes only a few strokes or only one stroke. These different stroke counts can be additionally combined with different velocities of the mold and the holding means so that their movement, in particular also with a movement of the cooling and/or calibrating mold, can be synchronized or matched to one another. By combining the possible movement forms of the mold, the holding means and, in particular, the cooling and/or calibrating mold accordingly, plastic profiles in virtually any form can be produced without faults.

In particular, it can be provided that the mold and the holding means are moved discontinuously or incrementally back and forth on the plastic profile, wherein a relative movement of the mold and the holding means with respect to the plastic profile takes place only during the movement of the mold and the holding means contrary to the production direction. As a result of this incremental transfer of the plastic profile to the holding means and the mold for removal, a particularly uniform movement and therefore pulling-off of the fibers from the fiber spools is achieved. As a result of this uniformity, the production of the plastic profile takes place in a particularly stress-free manner.

According to the method, it can preferably be provided that, in phases in which the holding means and the mold move toward one another on the plastic profile, the holding means is brought out of contact with the plastic profile and the plastic profile is only held frictionally by the mold and, in phases in which the holding means and the mold move in opposite directions away from one another, the plastic profile is moved relative to the mold and is only held by the holding means.

According to a further configuration of the method it can be provided that, during production, the plastic profile is cooled and/or calibrated by a cooling mold and/or a calibrating mold, wherein the cooling and/or calibrating mold is guided in particular between the mold and the holding means on the plastic profile. As a result of cooling or calibrating the plastic profile during production, the profile can cure particularly rapidly and be produced with high quality. In particular, for holding the plastic profile with the holding means and pulling it forward, it is important that the plastic profile cools rapidly. In the radius pultrusion method, it is advantageous to cool the profile down again after it exits the mold and before it enters the gripper, either so that it is sufficiently stable or so as to not ruin the material of the gripper. Since the profile can still be somewhat deformable after exiting the mold, it could moreover also become somewhat deformed, e.g. stretched, by the pull-off force which builds up between the mold and the gripper. Depending on the situation, the cooling mold can also additionally assume the function of correcting or calibrating the radius and/or the cross-sectional form of the profile. Therefore, the cooling and calibrating mold does not have to be a separate component; instead, it can also be part of the mold.

It can furthermore be provided that the movement of the cooling and/or calibrating mold on the plastic profile is coupled with the movement of the mold and/or the holding means. As a result of this coupling of the movement of the cooling and/or calibrating element to the movement of the mold and/or the holding means, the overall movement of the plastic profile can be adapted to the movement of the cooling and/or calibrating mold. The cooling and/or calibrating process can thus be adapted as required to the production of the plastic profile.

A particular embodiment of the present invention can furthermore provide that the reinforcement is held taut during the movement of the mold. By holding the reinforcement taut, the reinforcement is pulled into the mold precisely at the point where it is provided. Any stresses or other faults caused by the reinforcement being introduced incorrectly can therefore be prevented.

A device for achieving the object mentioned at the outset is a device for producing a preferably curved plastic profile, having a mold, in which a continuous reinforcement can be embedded, and a holding means with which the plastic profile can be guided through the mold, characterized in that the at least one mold and the at least one holding means can be moved simultaneously back and forth on the plastic profile in opposite directions. Accordingly, it is provided that the at least one mold and the at least one holding means can be moved simultaneously back and forth on the plastic profile in opposite directions. As a result of this movable arrangement of the holding means and the mold on the plastic profile, it is possible to remove the plastic profile in the production direction in an at least virtually continuous manner. By reducing the stationary phases of the plastic profile, mechanical stresses and tensions when pulling the reinforcements into the mold are prevented. As a result of this caterpillar-like, synchronized back and forth movement of the mold and the holding means, the plastic profile is formed by the mold at the same time as it is also removed. As a result of the simultaneous contrary movement of the mold and the holding means, the velocity values of the mold and the holding means are added together, resulting in a greater production velocity, which exceeds the velocity of the mold and the holding means. Therefore, both a high quality of the plastic profile to be produced and a greater production velocity of the profile are achieved.

A further advantageous exemplary embodiment of the present invention can provide that, as seen in the production direction, the at least one holding means is arranged in front of the at least one mold, wherein the at least one holding means and/or the at least one mold are formed for producing a releasable gripping connection with the finished plastic profile. By forming the mold and the holding means as a type of gripping device which can releasably grasp the plastic profile, the plastic profile can be advanced virtually continuously in the production direction. The gripping or grasping or holding of the plastic profile takes place in rapid exchange between the mold and the holding means, wherein, in each case, the device holding the plastic profile moves forward in the production direction. Whilst the holding means can be formed in two parts and the two parts lie around the profile for the purpose of holding the profile, the holding of the plastic profile by the mold is realized frictionally. The friction between the mold and the plastic profile is greater than the counter forces, for example through the strands which are pulled into the mold.

It can moreover be provided according to the invention that a cooling mold and/or a calibrating mold are arranged on the plastic profile, in particular between the mold and the holding means. Whilst the cooling mold can be provided with a suppliable coolant or has an internal cooling mechanism, the calibrating mold has corresponding means for calibrating the method or the device for producing the plastic profile. As a result of this integration of the cooling and/or calibrating mold, a particularly compact and efficient device can be realized. It is moreover conceivable that further molds or elements which serve for producing the plastic profile can be positioned between the at least one mold and between the at least one holding means. As seen in the production direction, such elements can also be arranged behind the at least one holding means.

BRIEF DESCRIPTION OF THE DRAWINGS

Preferred exemplary embodiments of the invention are explained in more detail below with reference to the drawing, which shows.

DETAILED DESCRIPTION OF PREFERRED EMBODIMENTS

Figure 1A:
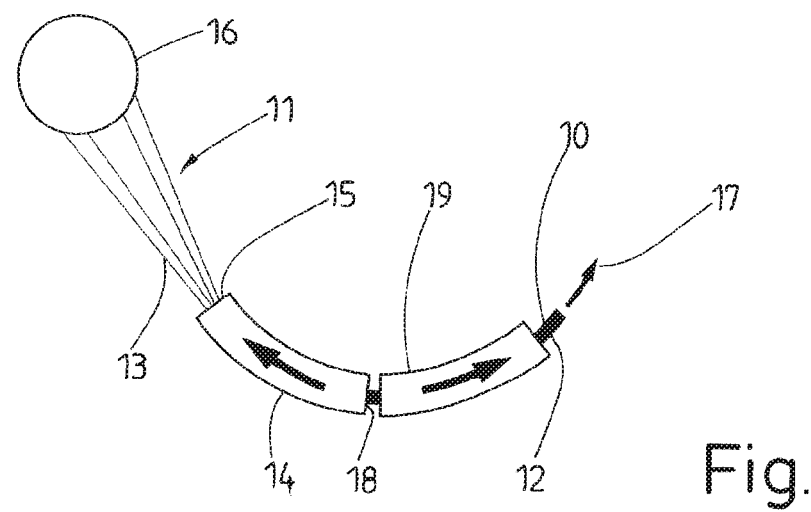
FIG. 1a is a schematic view of a first exemplary embodiment of a device according to the invention in a starting position.
Figure 1B:
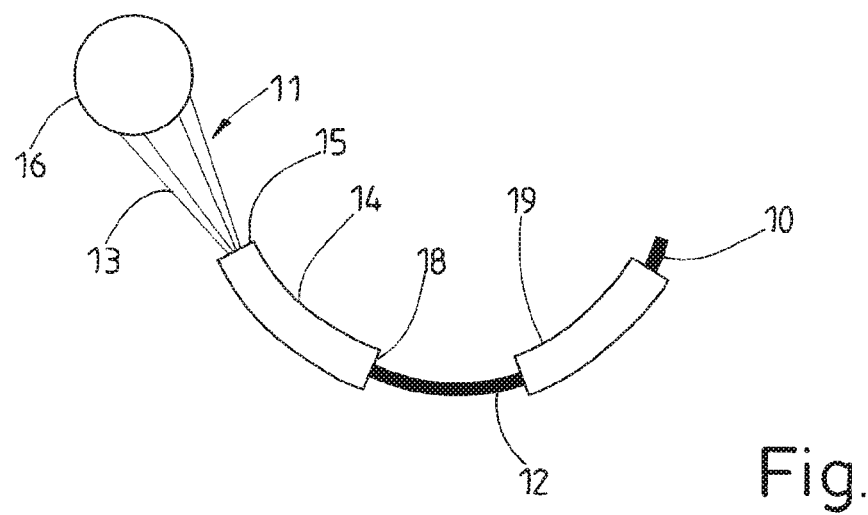
FIG. 1b shows the device of FIG. 1 according to a first operating step, which follows the starting position.

The figures show, in a highly schematic form, a device according to the invention, which also serves for carrying out the method according to the invention. This device is a pultrusion device for a plastic profile 10 having an internal reinforcement 11 and a plastic 12 surrounding this, which can preferably be a thermosetting plastic. In the exemplary embodiment, which is only shown schematically, it is assumed that the reinforcement 11 comprises a plurality of continuous strands 13 made from fibers which preferably have a high tensile strength, for example carbon fibers. However, any other reinforcements can also be embedded in the plastic 12 of the plastic profile 10, for example reinforcements made from webs and/or knitted fabrics or a combination of strands 13 with webs and/or knitted fabrics.

With the schematically shown device and the method according to the invention, plastic profiles 10 with any desired progression can be produced by pultrusion. By way of example, the figures show a curved plastic profile 10 which has a circular progression. The plastic profile 10 shown is curved in one plane. However, it is also conceivable for plastic profiles 10 which possess a three-dimensional progression to be produced with the device according to the invention and the method according to the invention. The device shown in FIGS. 1a to 1d has a mold 14 which corresponds to the curved progression of the plastic profile 10 to be produced. A longitudinal center axis of the mold 14 is therefore curved in exactly the same way as the plastic profile 10 to be produced, whereby the radius of the plastic profile 10 and the longitudinal center axis of the mold 14 are the same. The mold 14 exhibits an adaptation to the curved progression of the plastic profile 10, which, in the exemplary embodiment shown, are similar to the shape of a circular ring segment.

An unspooling device 16 (illustrated schematically in the figures) is associated with a rear end 15 of the mold 14. This unspooling device holds a certain supply of the reinforcement 11. In the exemplary embodiment shown in FIGS. 1a to 1d, in which the reinforcement 11 is formed from a plurality of strands 13, a corresponding number of spools with a greater supply of strands 13 is arranged on the unspooling device 16. The spools can be driven and/or braked so that the strands 13 can always be held taught with a predetermined tension.

In the region of the rear end 15 at which the strands 13 run into the mold 14, a device (not shown in the figures) is also provided for supplying liquid, in particular hot, plastic 12. Liquid plastic 12 is thus supplied to the mold 14 for sheathing the strands 13. Over time, the plastic 12 sets in the mold 14 and thereby cures.

In the exemplary embodiment of the device according to the invention which is illustrated in FIGS. 1a to 1d, a holding means 19 is provided, which is arranged on the plastic profile 10 at a slight spacing from the front end 18 of the mold 14, as seen in the production direction 17. Like the mold 14, this holding means can be a gripper for releasably gripping the plastic profile 10. The holding means can grip and clamp the finished plastic profile 10 in a region which is located in front of the mold 14, but it can also be released from the plastic profile 10. It is furthermore conceivable to associate an additional holding means with the rear end 15 of the mold 14, which rear end faces the unspooling device 16, wherein this holding means can be arranged in front of the rear end 15 of the mold or it can also be positioned in the rear end 15 of the mold 14.

A separate slide is associated with both the mold 14 and the holding means 19 in each case. These slides are not shown in the figures. These slides follow one another in the production direction 17, wherein, as seen in the production direction 17, the slide for the holding means 19 is located in front of the slide of the mold 14. The slides are formed so that both the mold 14 and the holding means 19 can be moved thereon such that they follow the curved progression of the plastic profile 10. The slides are provided with independent drives and possess controls which permit independent movement.

For complex progressions of the plastic profile 10, in particular spatially three-dimensional curved plastic profiles 10, the paths of the slides and also the shape of the mold 14 are adapted accordingly. It is also conceivable to arrange both the mold 14 and the holding means 19 on robot arms having a corresponding number of degrees of freedom or axes, whereby, as a result of correspondingly coordinated controls, the robots move the mold 14 and also the holding means 19 on any paths corresponding to the desired progression of the plastic profile 10 and, as a result, plastic profiles 10 having any shape, also a three-dimensional shape, can also be produced with such a device.

In an exemplary embodiment of the device according to the invention, which is furthermore illustrated in FIGS. 2a to 2d, a cooling mold 20 is arranged on the plastic profile 10 between the mold 14 and the holding means 19. This cooling mold 20 can alternatively also be a calibrating mold or the cooling mold 20 can simultaneously be a cooling mold 20 and calibrating mold. According to the exemplary embodiment of FIGS. 2a to 2d, this cooling mold 20 is arranged in a stationary manner between the mold 14 and the holding means 19, i.e. the cooling mold 20 is not movable in or contrary to the production direction 17 on a slide.

An exemplary embodiment of the present invention, which is illustrated in FIGS. 3a to 3d, likewise has a cooling mold 21, which can likewise alternatively be a calibrating mold. The cooling mold illustrated in FIG. 3a to FIG. 3d can also be associated with a movable slide (not illustrated) so that the cooling mold 21, like the mold 14 and the holding means 19, can move in or contrary to the production direction 17 on the plastic profile 10.

The method according to the invention will be explained in more detail below with reference to the production of an arcuate plastic profile 10 by way of example.

FIG. 1a illustrates a starting position of the method for producing a plastic profile 10 by means of the device according to the invention, which is illustrated in FIGS. 1a to 1d. In this starting position, the mold 14 and the holding means 19 are located close together or are in mutual contact. The mold 14 and the holding means 19 on the plastic profile 10 then move in opposite directions on the plastic profile 10. In this case, the already finished plastic profile 10 is held by the holding means 19, whereby it is removed in the production direction 17. The spacing between the mold 14 and the holding means 19 increases during this. During this movement of the mold 14 and the holding means 19 along the plastic profile 10, further strands 13 are pulled into the rear end 15 of the mold 14. Likewise, the liquid plastic (not illustrated here) is supplied to the rear end 15 of the mold 14. The velocity of the mold 14 and the holding means 19 on the plastic profile 10 is identical, although it can also be different in each case so that, for example, the holding means 19 is moved in the production direction 17 at a greater speed than the mold 14.

Figure 1C:
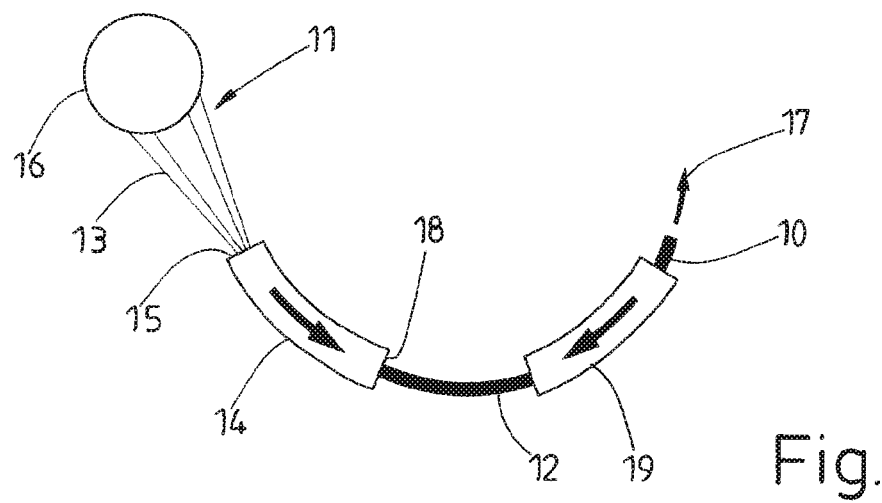
FIG. 1c shows the device of FIGS. 1a and 1b before a second operating step.
Figure 1D:
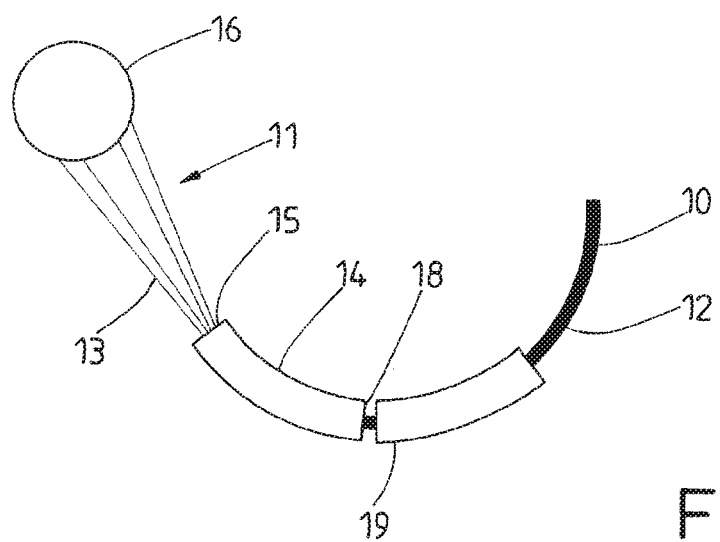
FIG. 1d shows the device of FIGS. 1a to 1c in an end position.
Figure 2A:
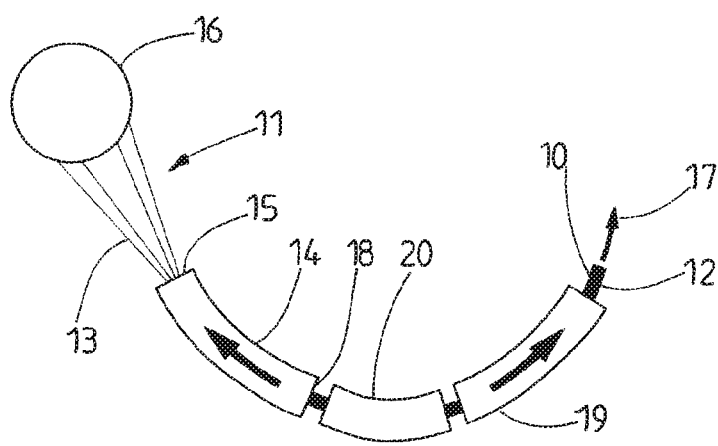
FIG. 2a is a schematic view of a second exemplary embodiment of a device according to the invention in a starting position.
Figure 2B:
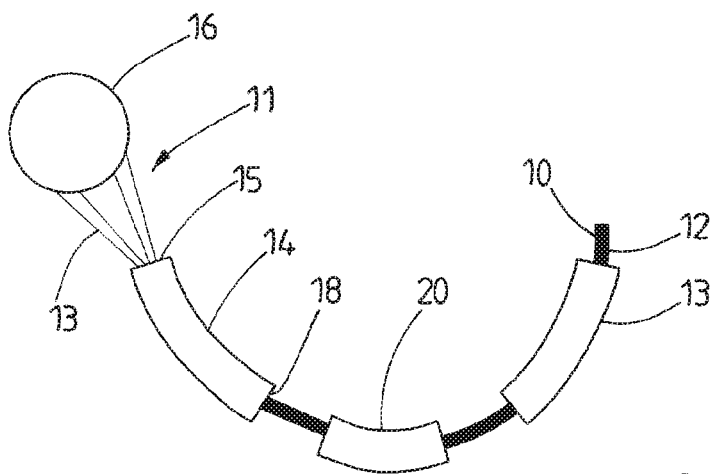
FIG. 2b shows the device of FIG. 2a according to a first operating step, which follows the starting position.
Figure 2C:
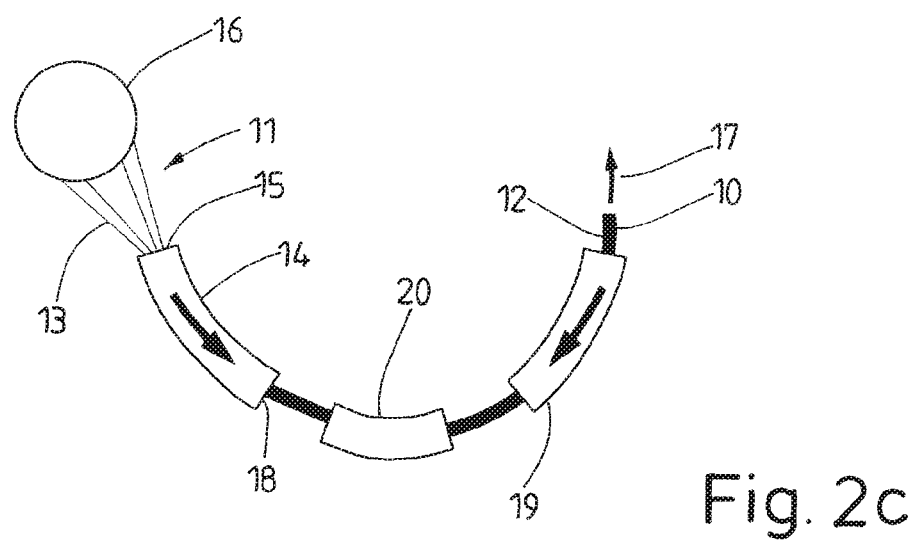
FIG. 2c shows the device of FIGS. 2a and 2b before a second operating step.
Figure 2D:
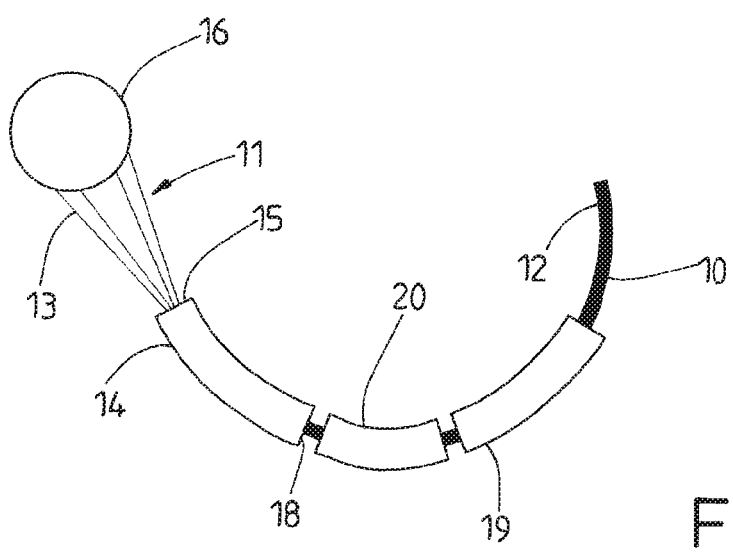
FIG. 2d shows the device of FIGS. 2a to 2c in an end position.
Figure 3A:
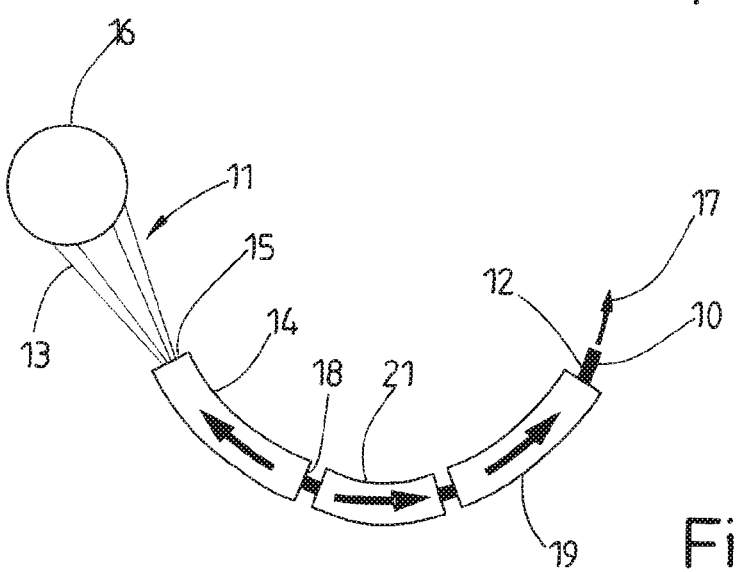
FIG. 3a is a schematic view of a further exemplary embodiment of a device according to the invention in a starting position.
Figure 3B:
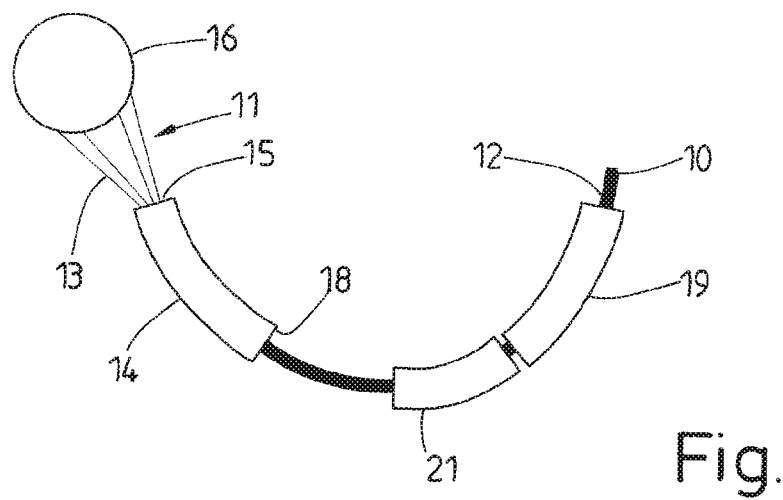
FIG. 3b shows the device of FIG. 3a according to a first operating step which follows the starting position.
Figure 3C:
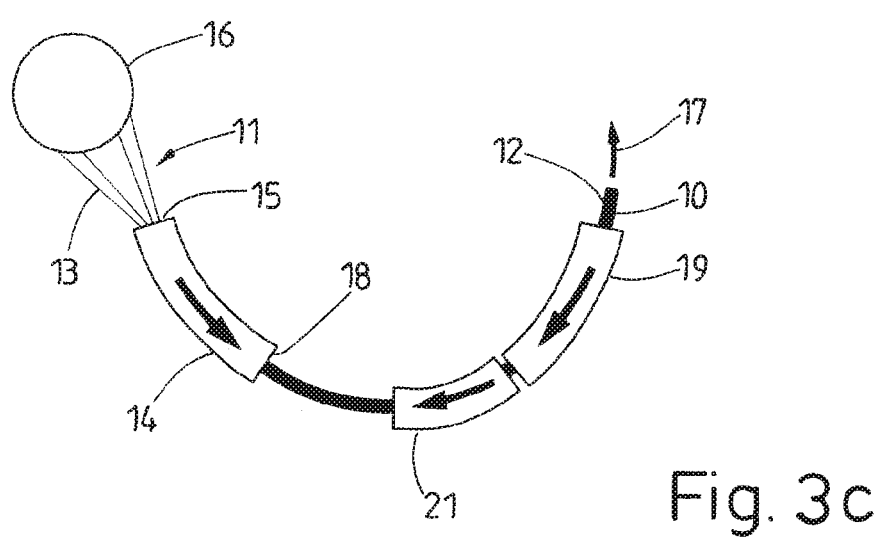
FIG. 3c shows the device of FIGS. 3a and 3b before a second operating step.
Figure 3D:
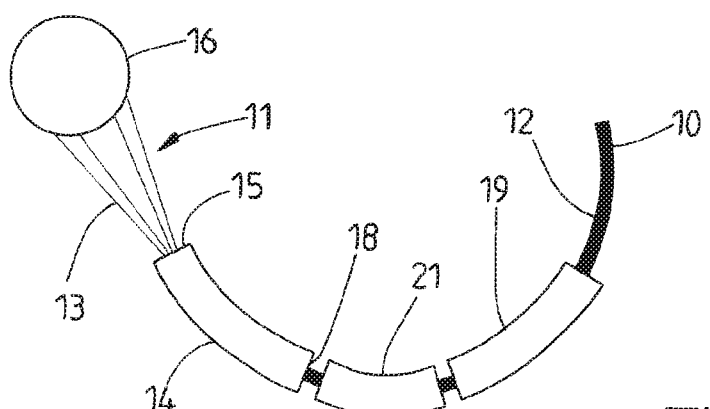
FIG. 3d shows the device of FIGS. 3a to 3c in an end position.

As soon as the mold 14 and the holding means 19 have reached their maximum amplitude, i.e. their greatest spacing with respect to one another (FIG. 1b), the holding means 19 is released from the plastic profile 10, which, at the same moment, is moved together with the mold 14 back into the starting position (FIG. 1c). The holding means 19 likewise moves contrary to the production direction 17 back into the starting position (FIG. 1d). Owing to the friction, the finished plastic profile 10 is moved along in the production direction 17 by the movement of the mold 14 so that further strands 13 of the reinforcement 11 are unrolled by the unspooling device 16. In the end position of the production cycle, which is illustrated in FIG. 1d, it is clearly shown that a longer section of the finished plastic profile 10 now projects out of the holding means 19. As soon as the mold 14 and the holding means 19 have reached this position, the method begins again so that the plastic profile 10 hardly ever becomes stationary, if at all, and continues to "grow".

In a further exemplary embodiment of the present invention, which is illustrated in FIGS. 2a to 2d, a cooling mold 20 is clamped between the mold 14 and the holding means 19 during a method for producing the plastic profile according to FIGS. 1a to 1d. The method illustrated in FIGS. 2a to 2d is the same as the method illustrated in FIGS. 1a to 1d except that the plastic profile 10 is now cooled by the cooling mold 20 after it has exited the front end 18 of the mold 14. The plastic profile 10 cures more rapidly as a result of the cooling. This more rapid cooling of the plastic profile 10 is particularly advantageous in particular for some forms or materials for a plastic profile. The plastic profile 10 which is subsequently cooled is then pushed through the holding means 19, as described above, or grasped by the holding means 19 and pulled in the production direction 17.

In a further exemplary embodiment of the method according to the invention, which is illustrated in FIGS. 3a to 3d, a cooling mold 21 is arranged between the mold 14 and the holding means 19, which cooling mold is likewise associated with a slide and, like the mold 14 and the holding means 19, can move along the plastic profile 10. This movement of the cooling mold 21 on the plastic profile 10 can be coupled with the movement of the mold 14 and/or the holding means 19. The coupled movement of the cooling mold 21 with the mold and/or the holding means serves especially to minimize the region of the plastic profile 10 which is not supported by the mold 14 or the holding means 19 during the production process. Instead of the cooling mold 21, a calibrating mold can also be provided in the exemplary embodiment illustrated in FIGS. 3a to 3d.

At this point, it should be expressly pointed out that the present invention is not intended to be restricted to the exemplary embodiments illustrated in the drawing, but instead also extends to further embodiments, in particular embodiments in which the mold, cooling unit and gripper are resilient and move in a guided manner along the shape of the profile to be manufactured.

LIST OF REFERENCE SIGNS

10 Plastic profile
11 Reinforcement
12 Plastic
13 Strand
14 Mold
15 Rear end

16 Unspooling device
17 Production direction
18 Front end
19 Holding means
20 Cooling mold
21 Cooling mold

What is claimed is:

1. A method for producing a curved plastic profile (10), wherein a continuous reinforcement (11) comprising strands (13) or webs is guided by a holding means (19) through a mold (14) and embedded in plastic (12) in the mold (14), comprising:

moving the mold (14) and the holding means (19) simultaneously in opposite directions on the plastic profile (10), whilst moving the plastic profile (10) forward uninterruptedly in a production direction (17) by the mold (14) or the holding means (19), wherein the plastic profile (10) is moved alternately by the mold (14) and the holding means (19) in the production direction (17); and in phases in which the holding means (19) and the mold (14) move toward one another on the plastic profile (10), bringing the holding means (19) out of contact with the plastic profile (10) and holding the plastic profile (10) only frictionally by the mold (14) and, in phases in which the holding means (19) and the mold (14) move in opposite directions away from one another, moving the plastic profile (10) relative to the mold (14) and holding the plastic profile (10) only by the holding means (19).

2. The method as claimed in claim 1, further comprising holding the plastic profile (10) by the holding means (19) and pulling the plastic profile (10) in the production direction (17), whilst moving the mold (14) on the plastic profile (10) contrary to the production direction (17).

3. The method as claimed in claim 1, further comprising moving the plastic profile (10) by the mold (14) in the production direction (17), whilst moving the holding means (19) contrary to the production direction (17) on the plastic profile (10) toward the mold (14) by bringing the holding means (19) into contact with the mold (14).

4. The method as claimed in claim 1, further comprising moving the mold (14) and the holding means (19) in or contrary to the production direction (17) on the plastic profile (10) at different velocities.

5. The method as claimed in claim 1, further comprising moving the mold (14) and the holding means (19) forward on the plastic profile (10) with a different stroke or different amplitudes and/or different frequencies.

6. The method as claimed in claim 1, further comprising moving the mold (14) and the holding means (19) discontinuously or incrementally back and forth on the plastic profile (10), wherein a relative movement of the mold (14) and the holding means (19) with respect to the plastic profile (10) takes place only during the movement of the mold (14) and the holding means (19) contrary to the production direction (17).

7. The method as claimed in claim 1, further comprising, during production, cooling and/or calibrating the plastic profile (10) by a cooling mold (20, 21), wherein the cooling mold (20, 21) is guided between the mold (14) and the holding means (19) on the plastic profile (10).

8. The method as claimed in claim 7, further comprising coupling the movement of the cooling mold (20, 21) on the plastic profile (10) with the movement of the mold (14) and the holding means (19).

9. The method as claimed in claim 1, further comprising holding the reinforcement (11) taut during the movement of the mold (14).

10. The method as claimed in claim 1, further comprising moving the mold (14) and the holding means (19) in or contrary to the production direction (17) on the plastic profile (10) with different accelerations.

* * * * *

UNITED STATES PATENT AND TRADEMARK OFFICE
CERTIFICATE OF CORRECTION

Page 1 of 1

PATENT NO. : 11,273,612 B2
APPLICATION NO. : 16/318514
DATED : March 15, 2022
INVENTOR(S) : Klaus Jansen It is certified that error appears in the above-identified patent and that said Letters Patent is hereby corrected as shown below:

On the Title Page

(30) Foreign Application Priority Data should read:
Aug. 16, 2016 (DE) .............................. 102016009953.4
Aug. 05, 2016 (DE) .............................. 102016009474.5

Signed and Sealed this
Second Day of January, 2024

Katherine Kelly Vidal
*Director of the United States Patent and Trademark Office*